Patented Sept. 14, 1937

2,093,131

UNITED STATES PATENT OFFICE 2,093,131

PREPARATION FOR IMPARTING SWELLING CAPACITY OR LOOSENING SUBSTANCES OF VARIOUS ORIGIN CONTAINING ALBUMEN OR CELLULOSE

Willi Lebus, Berlin-Charlottenburg, Germany, assignor of one-half to Carl Wilhelm Horter, Scheveningen 30 Gevert Deynootplein No Drawing. Application October 14, 1933, Serial No. 693,668. In Germany March 29, 1932

9 Claims. (Cl. 99—90)

This invention relates to the manufacture and application of a preparation for rendering substances of different origin containing albumen or cellulose capable of swelling or for loosening them up. For example, the preparation may be used for facilitating baking, by increasing the swelling capacity of flours, for rendering animal albumen, such as casein in milk, capable of swelling, or as decomposing agent for cellulose and cellulose-containing substances, and for numerous other purposes, particularly for preparing foodstuff and strengthening preparations.

It has been proposed already to improve the swelling power of difficultly swelling substances by the addition of chemicals, but this is a makeshift open to serious objections from the point of view of hygiene and dietetics. It has further been proposed to influence the process of fermentation in bread-making by agents containing substances or producing doughs which respond more readily to the action of the raising agent than the constituents found in the flour, the main representatives of this group including monosaccharides, hydrolized starch or substances producing it, such as malt extracts and other diastase carriers. Another group aims in the main at improving the swelling power of flours, preference being given to those products that have a favorable effect also on the fermentation process, such as, above all, mashed boiled potatoes, rice, maize, yucca, bananas and especially the dry products made therefrom including potato-flour, rice and maize meal for baking, yucca flour and banana meal. Still another group of baking agents serves for increasing the low natural gluten content of the flours by bringing in albuminous substances; this group covers more or less pure legume meals, particularly soy bean meal.

It is the object of the invention to provide a preparation for decomposing, loosening, and imparting swelling capacity to, substances containing albumen or cellulose, flour and numerous other animal and vegetable products in a strictly organic manner without the use of chemical agents favoring swelling capacity yet foreign to the nature of the substances to be swelled and loosened up and without the use of self-swelling additions, such as rice baking flour or albumen capable of swelling.

As basic material for the preparation according to the invention there is employed dried yeast of known kind. The invention provides that dried species of saccharomyces reduced to a fraction, say 5%, of their enzymatic efficiency are mixed with carbohydrates, especially with grain constituents like bran and the like. The preparations thus obtained are added to the substances to be treated to promote various swelling, decomposition and loosening processes in proportions that have to be ascertained by experiment in each instance. The effect of the preparation is due to the well-known fact that dried species of saccharomyces, particularly beer yeast, act very energetically upon a number of organic substances, though this action, for the purposes mentioned above, proceeds as a rule so fast that it practically cannot be utilized at all. According to the invention, these drawbacks can be eliminated by systematically drying yeast up to a certain degree of reduced enzyme efficiency and then mixing it with carbohydrates. It has been found that satisfactory materials of this kind are particularly bran and bran-containing flours of all sorts with or without supplementary mono- or polysaccharides. The last-mentioned materials can be replaced also by enzymatic substances which like diastase containing germs quickly convert the starch of the flour into sugar. The action of the preparation according to the invention with respect to the intensity and duration of rendering gluten capable of swelling can therefore be regulated by reducing or increasing the share of active yeast enzymes or by varying the nature and quantity of the carbohydrates added.

In order to use a preparation according to the invention as a baking agent, it is possible for instance to mix a dried beer yeast limited in enzymatic efficiency with additions of grain constituents or branny pollards from the grain grinding process. These additions represent nutrients for the yeast enzymes. For example, a mixture well suited to act as baking agent consists of 30% of a dried yeast, particularly dried beer yeast, 50% pollard and 20% cane sugar. If necessary the preparation may be employed, together with the usual raising agents, during the fermenting and baking process.

The preparation effects decomposition of the cells of the aleurone layer and brings about an improvement of the fermenting and baking process. It can be added either before baking when mixing the dough by stirring or it may be added to the flour already in the mill. In the latter case, this may be done by grinding flours which contain bran and, besides the usual raising agents, adding to them dry yeast of restricted enzymatic efficiency in quantities corresponding to the bran content of the flour, whereby the baking capacity is considerably enhanced. This increase in baking capacity is particularly important in case of grains that have been cultivated with a view to largest possible yield and the swelling power of which has been affected thereby.

The preparation can likewise be used for working rye and wheat flour into bakers' products.

For example, when preparing the dough, to 10 kg. rye flour 6 to 6.5 l. water and 100 to 120 g. of the preparation are added which may previously have been soaked in warm water. The dough is then permitted to rest for some time and work prior to further treatment. In case of full leavening the entire amount of the preparation is suitably added when the leaven is prepared to insure a better and more thorough loosening effect.

Corresponding proportions are employed when wheat flour is used, that is, to 10 kg. flour and about 7 to 7.5 l. water about 100 g. of the preparation or about 1% of the total amount of flour are added. Hard-glutinous flour of good feel requires a somewhat larger amount of preparation, namely about 1 to 1.5% of the total quantity of flour or 20 to 30 g. for each litre water. Soft glutinous doughy flour, on the other hand, needs only a slight addition of approximately 1 to ½% of preparation of the total amount of flour or 20 to 10 g. for each litre water.

When wheaten ware is to be made, the preparation is added to the dough together with the yeast after it has preferably been soaked in warm water. As in making rye ware, the dough is allowed to rest for some time before further treatment to let it work. If a first batch or a yeast-dough is made, the preparation is added thereto, possibly already the night before the further treatment begins. Addition takes place in proportion to the amount of flour or water used for the batch. The remaining portions of the preparation are then added again in corresponding amounts when the main batch of dough is prepared.

Baker's ware made with an addition of this preparation will be insensitive, to a large extent, to overleavening; baking errors will be automatically compensated. The preparation serves therefore for the enzymatic decomposition of rye and wheat flour without regard to the degree of grinding, and can thus be used also for very highly cultivated flours which are rich in bran. Owing to this increased decomposition of the flour and a more intense swelling of the albumen content or gluten, the preparation brings about a considerable increase in dough yield. In case of wheat flour, the reinforcing effect upon the gluten is so remarkable that even inferior flours will become almost equal to high-grade-flours in quality, yield and baking capacity. The addition of the preparation to rye or wheat results in considerably increased dough yield, shortens the fermenting period, increased baking capacity and essentially accelerates the baking process. Furthermore, it produces a more tasteful, wholesome and uniform ware of best appearance, increased volume and great keeping quality.

These features permit the best utilization possible of any kind of flour and insure the production of a ware that is excellent in every respect and highly beautiful.

The preparations according to the invention are further excellently adapted for rendering other albumen- or cellulose-containing substances besides flour capable of swelling or for loosening them up (or spongifying them). In these albuminous substances, which per se possess little or no swelling power and which are to be swelled by the preparation according to the invention, vegetable or animal albumen may be concerned or cellulose-containing substances of various kinds.

Especially important fields of application of the preparations according to the invention are cheese making and the manufacture of malt, though they may be profitably used also in numerous other spheres where albuminous substances are to be caused to swell. The amount and composition of the preparations may vary according to requirements and must be determined empirically if necessary.

In the manufacture of cheese, an addition of a few say 50 g. of the yeast preparation according to the invention to every 100 l. milk will cause swelling of the casein contained in the curd. Cheese produced by means of the preparation will ripen more quickly and disclose remarkable uniformity, pleasing taste and odor free from malodorous constituents so often found in cheese.

A similar effect has the addition of the preparation upon the working of skim milk, in margarine production for instance. Owing to the swelling of the casein constituents suspended in the skim milk, the latter acquires after a relatively short time a thick and creamy quality whereby churning is facilitated. The amounts of preparation to be added correspond to the quantities of ingredients used in cheese making and must be determined by experiment.

The yeast preparation according to the invention can further be employed in malt making. When steeping the barley amounts of preparation determined by experiment are added to the water and during subsequent malting germination of the barley to be malted will be facilitated. For this purpose, a preparation comprising a mixture of 50% yeast and 50% pollard with or without additional nutrients may be used. The action of the added preparation during malting consists in loosening the cellulose constituents whereby the steeping as well as the germinating process are furthered. The function of the two essential constituents of the preparation, i. e., the dried yeast restricted in its enzymatic action and the bran or the other nutrients taking the place of bran, during this step consists probably in having the yeast act as nutrient for the bran enzymes. The great economic importance of employing the preparation in malt making is due to the fact that even hard thick-bearded winter barleys which otherwise cannot be used in malting may be worked without the least trouble.

A sphere of application related in certain respects to the one just described is the decomposition of cellulose substances in general, decomposition taking place without the application of the usual methods including treatment with soda lye under pressure or similar processes.

In other fields, too, besides those mentioned, an addition of the preparation according to the invention will cause swelling of the treated substances, particularly of the albuminous substances. In this connection, pharmaceutical preparations of all sorts which contain albumen in any form may be mentioned, such as the casein preparation known under the trade-mark name "Sanatogen". A considerable advantage of the preparation according to the invention as compared with other swelling and decomposing agents is that its effect is the same whether used in an acid or alkaline medium. Its uses further comprise albuminous foodstuff for diabetics and practically all albuminous foods prepared in the kitchen and requiring spongifying, such as potato dumplings, mayonnaise, rissoles or the like.

The composition of the preparation may change according to its use and the desired manner and degree of influencing the swelling and loosening process. The nature of the species of saccharomyces employed may also require a change in composition to be determined by experiment if necessary.

The important principle always is that the efficacy of the preparation is brought about by purely organic constituents produced by the living nature and to the total exclusion of chemical reaction substances. In certain cases, retarding substances, such as common salt or other easily dissociable salts, can be added to the preparation.

I claim:

1. A preparation for increasing the swelling capacity of, and for loosening up, albuminous or cellulose containing substances, particularly for use as a baking agent, which comprises 30% dried yeast reduced to approximately 5% enzymatic action, 50% pollard and 20% cane sugar.

2. A preparation for increasing the swelling capacity of, and for loosening up, albuminous or cellulose containing substances, particularly for use in increasing the germinating power of malting barley, which comprises 50% dried yeast reduced to approximately 5% enzymatic action and 50% pollard.

3. A preparation for increasing the swelling capacity of, and for loosening up, albuminous or cellulose containing substances, which comprises dried yeast having the major portion of its enzymatic activity destroyed in admixture with a carbohydrate.

4. A preparation for increasing the swelling capacity of, and for loosening up, albuminous or cellulose containing substances, which comprises dried yeast having the major portion of its enzymatic activity destroyed in admixture with a grain constituent.

5. A preparation for increasing the swelling capacity of, and for loosening up, albuminous or cellulose containing substances, which comprises dried yeast having the major portion of its enzymatic activity destroyed in admixture with branny pollard.

6. A preparation for increasing the swelling capacity of, and for loosening up, albuminous or cellulose containing substances, which comprises dried yeast having the major portion of its enzymatic activity destroyed in admixture with a grain constituent, a saccharide, and an enzymatic substance capable of rapidly converting starch into sugar.

7. A preparation for increasing the swelling capacity of, and for loosening up, albuminous or cellulose containing substances, which comprises dried yeast reduced to 5% of its original enzymatic action in admixture with a carbohydrate.

8. A preparation for increasing the swelling capacity of, and for loosening up, albuminous or cellulose containing substances, which comprises dried yeast reduced to 5% of its original enzymatic action in admixture with a grain constituent.

9. The process of making bread, which comprises the step of forming a dough containing dried yeast having the major portion of its enzymatic activity destroyed in admixture with a carbohydrate.

WILLI LEBUS.